(12) United States Patent
Aikio

(10) Patent No.: US 11,237,380 B2
(45) Date of Patent: Feb. 1, 2022

(54) EYEPIECE FOR A PERSONAL DISPLAY AND PERSONAL DISPLAY COMPRISING SUCH EYEPIECE

(71) Applicant: Dispelix Oy, Espoo (FI)

(72) Inventor: Mika Aikio, Espoo (FI)

(73) Assignee: Dispelix Oy, Espoo (FI)

( * ) Notice: Subject to any disclaimer, the term of this patent is extended or adjusted under 35 U.S.C. 154(b) by 160 days.

(21) Appl. No.: 16/618,131

(22) PCT Filed: May 18, 2018

(86) PCT No.: PCT/FI2018/050372
§ 371 (c)(1),
(2) Date: Nov. 28, 2019

(87) PCT Pub. No.: WO2018/220267
PCT Pub. Date: Dec. 6, 2018

(65) Prior Publication Data
US 2020/0116991 A1 Apr. 16, 2020

(30) Foreign Application Priority Data

Jun. 2, 2017 (FI) .................................... 20175502

(51) Int. Cl.
*G02B 25/00* (2006.01)
*G02B 15/14* (2006.01)
(Continued)

(52) U.S. Cl.
CPC ... *G02B 25/001* (2013.01); *G02B 15/143105* (2019.08); *G02B 15/163* (2013.01); *G02B 25/04* (2013.01)

(58) Field of Classification Search
CPC .. G02B 25/001; G02B 25/004; G02B 25/005; G02B 25/008; G02B 15/143105; G02B 15/163
(Continued)

(56) References Cited

U.S. PATENT DOCUMENTS 3,638,996 A 2/1972 Klein
4,721,371 A * 1/1988 Imai ............... G02B 15/143105
359/689
(Continued)

FOREIGN PATENT DOCUMENTS

CN 104049368 B 8/2016
CN 106773048 A 5/2017
(Continued)

OTHER PUBLICATIONS

Rakkolainen et al: A superwide-FOV optical design for head-mounted displays. International conference on artificial reality and telexistence and eurographics symposium an virtual environments, 2016, pp. 45-48.

*Primary Examiner* — Kristina M Deherrera
(74) *Attorney, Agent, or Firm* — Laine IP Oy

(57) ABSTRACT

The invention relates to personal display devices and in particular an eyepiece therefor. The eyepiece is adapted for projecting an image from an image plane on one side of the eyepiece through an exit pupil on the opposite side of the eyepiece and comprises at least one stationary lens group and at least two movable lens groups being movable with respect to the stationary lens group along an optical axis between the image plane and the exit pupil. According to the invention, the lens groups are arranged in positive-negative-positive configuration and the movable lens groups are arranged to move along the optical axis between a first state providing a first field-of-view and a second state providing a second field-of-view smaller than the first field-of-view to
(Continued)

the image plane. The invention allows for improving optical performance and user experience of personal display devices.

11 Claims, 3 Drawing Sheets

(51) Int. Cl.
  *G02B 15/163* (2006.01)
  *G02B 25/04* (2006.01)
(58) Field of Classification Search
  USPC .......................... 359/645, 695, 698
  See application file for complete search history.

(56) References Cited

U.S. PATENT DOCUMENTS

| | | | |
|---|---|---|---|
| 5,749,008 A * | 5/1998 | Ishihara | G02B 15/143105 396/373 |
| 5,757,544 A | 5/1998 | Tabata et al. | |
| 6,124,985 A | 9/2000 | Abe | |
| 6,312,129 B1 | 11/2001 | Sisodia et al. | |
| 6,362,925 B1 * | 3/2002 | Nakamura | G02B 15/143105 359/690 |
| 2003/0202254 A1 | 10/2003 | Kanai | |
| 2004/0070839 A1 | 4/2004 | Yagi et al. | |
| 2011/0221656 A1 | 9/2011 | Haddick et al. | |
| 2011/0234476 A1 | 9/2011 | Sugihara et al. | |
| 2014/0168765 A1 | 6/2014 | Betensky et al. | |

FOREIGN PATENT DOCUMENTS

| | | |
|---|---|---|
| JP | H03287217 A | 12/1991 |
| JP | H09189868 A | 7/1997 |
| JP | 2002072088 A | 3/2002 |
| WO | WO2017076241 A1 | 5/2017 |
| WO | WO2017079985 A1 | 5/2017 |

* cited by examiner

EYEPIECE FOR A PERSONAL DISPLAY AND PERSONAL DISPLAY COMPRISING SUCH EYEPIECE

FIELD OF THE INVENTION

The invention relates to optics of personal display systems used in virtual reality (VR) and augmented reality (AR) applications, for example. In particular, the invention relates to varifocal eyepieces for use in personal displays and personal displays containing such eyepiece.

BACKGROUND OF THE INVENTION

Due to the recent developments and progress in the micro display and near-to-eye display (NED) technology, virtual and augmented reality headsets are becoming more common. Some products have already been launched to consumer market, mainly for virtual reality applications, gaming and other entertainment. These headsets typically comprise a wide angle eyepiece for projection, the eyepiece comprising a single lens that can be aspheric and can comprise Fresnel grooves to reduce its weight. These systems are usually not exit pupil forming as the displays typically radiate in Lambertian pattern, but regardless of this property, the projection optics nevertheless need to be designed for a specific exit pupil value for pleasant viewing experience.

For compatibility with the human eye, the design exit pupil of the eyepiece, either non-pupil forming or pupil forming, must be located outside the lens assembly itself. The minimum recommended distance between the eyelens and the exit pupil ranges typically between 8 and 12 millimetres. This distance is also called an eye-relief. If the eye-relief is less than 8 millimetres, it is very likely that the user will mash his eyelashes against the eyepiece, which causes physical discomfort.

For these systems, a wide field of view is very important for the sake of immersion, and typical field of views range from 115 degrees to 95 degrees for a single lens element. The image source, such as a display panel, is typically larger than the lens itself. Typical distortion obtained from the f*tan(theta) projection law can easily exceed 50% in the existing wide angle eyepieces. This distortion is, however, of little consequence, as the distortion effect can be corrected with software, so that the user does not perceive significant distortion, and usually does not see the change of resolution at the image periphery on the display panel. This deviates from traditional eyepiece design where such distortion has not been as readily acceptable.

Prior art VR and AR eyepiece optics designed for wide angle projection perform usually satisfactorily for the virtual or augmented reality projection application if the intention is gaming. However, this configuration is problematic once the user would like to use the headset for something else, as the image periphery in wide angle projection is not resolved well enough by prior art visual systems. While cropping the image smaller is one solution for more comfortable watching experience, this operation can easily lose more than 50% of the display pixels, whereby the image quality suffers.

The prior art systems suggest that as much as 80% of the total image information can be lost if the field of view was cropped to 40-degree diagonal, and roughly 65% for the 60-degree diagonal. Roughly 2400 pixels along the diagonal are needed for a 40-degree viewing experience where the human vision system limits the perceived resolution (1 arc min). This would imply that a display used in the 90-110 degrees virtual reality projection would require anywhere between 5400 to 6600 pixels along the diagonal. This is outside the current realm of affordable virtual reality headsets, and thus the viewing experience will be limited by the display resolution for some years to come.

One existing eyepiece is disclosed in U.S. Pat. No. 3,768,890. The eyepiece has internal focusing implemented with two groups of lenses, and employs a variation of space between the two groups. Such eyepiece cannot however project sufficiently wide angle images for immersive VR or AR applications. U.S. Pat. No. 7,154,683, on the other hand, discloses an eyepiece with a configuration where every positive lens is a similar plano-convex lens. This eyepiece is not designed for continuous zooming nor can it provide the required field-of-view for wide-angle applications.

Thus, there is a need for novel eyepiece solutions for personal displays, having the capability to perform well in both wide angle and narrow angle solutions.

SUMMARY OF THE INVENTION

It is an aim of the invention to solve at least some of the abovementioned problems and to provide an eyepiece for use in personal displays and being capable of improving user experience of personal displays. One aim is to provide an eyepiece which suits better for a wide range of applications, such as watching movies and gaming, in particular allowing for wide angle image for immersive applications and optically better image in narrow-angle image applications. Further, an aim is to allow for the utilization of the whole display area in applications requiring good optical performance also on the peripheral areas, such as corners of the display. An additional aim is to provide an eyepiece which performs optically better in both wide angle and narrow angle applications.

A particular aim is to provide a new personal display with improved user experience and/or optical performance as described above, in particular a wearable personal device (headset) comprising a built-in display element or means for mounting an external display element and an eyepiece for projecting the image from the display to an eye of a viewer and providing an improved movie watching experience.

The aims are achieved by the invention as herein described and claimed.

The invention is based on the idea of providing an eyepiece for projecting an image on a image plane on one side of the eyepiece through an exit pupil on the opposite side of the eyepiece, the eyepiece comprising at least one stationary lens group and at least two movable lens groups being movable with respect to the stationary lens group along an optical axis between the image plane and the exit pupil. According to the invention, the lens groups are arranged in positive-negative-positive configuration and the movable lens groups are arranged to move along the optical axis between a first state providing a first field-of-view and a second state providing a second field-of-view smaller than the first field-of-view to the image plane.

The personal display device according to the invention comprises a display element or dedicated space and means for accommodating and immobilizing an external display element in a fixed position thereof, and an eyepiece of the abovementioned kind for projecting image from the display element to an eye of a viewer. The display element is fixed at the image plane of the eyepiece, thus providing a variable field-of-view on the display.

More specifically, the invention is characterized by what is stated in the independent claims.

The invention offers significant benefits. In particular, the invention allows the same display that is used for wide-angle projection to retain its pixel count in narrow projection angle application. This is accomplished by the present invention by using moving groups in suitable optical configuration to accommodate the system for the desired focal length, thus field of view, still taking advantage of the whole area of the display element. There is no need for cropping the image.

Particular advantages are gained in applications requiring user attention within the central part of the image and still containing important details in the periphery. An example of such application is watching television or movies. This is because the image in prior art VR/AR devices is either cropped or necessarily projected onto a very wide field of view, whereby the eyes consequently need to turn relatively much from the center in order to perceive details on the periphery of the image. Consequently, the viewing experience suffers and the eyes are stressed. Especially watching movies becomes tiresome as the action happens in a very wide field of view. It is difficult to concentrate on the movie as important details may occur in the periphery, at which the human eye has poor resolution and tilting the eyeball there causes eyestrain. In addition, according to studies, people recall faces, which fit in a relatively narrow field of view, typically about 20 degrees, which is therefore also the most natural and most convenient field for faces. If only a wide-angle state is available, faces appearing on a movie, for example, appear to be too intrusive.

The invention also provides a completely novel optical construction for a projection optics assembly that suits to be used as an eyepiece of a personal display. In particular, the optical construction provides changing the field-of-view, i.e. zooming, just by moving lens elements on one side of the image plane, i.e., on one side of the exit pupil. In addition, it provides sufficient eye-relief for the user, and with the control of distortion, sufficient projection angle for the wide angle applications, while keeping image quality high for e.g. television or movie applications in zoomed configuration.

By means of the invention is possible to reduce the display diagonal to roughly 60% of the display diagonal according to commercially available prior art, and to allow the field of view to be changed from 110 degrees to 40 degrees. This is made possible in particular by the present three-lens configuration as herein described. A smaller display is beneficial, as the whole display device can be made smaller and more lightweight without compromising the attainable field-of-view or image quality. Thus, maximal user experience can be provided in a wide range of applications, including gaming and movies, for example. While utilizing all available pixels of the display element, the image can expanded or compressed in all cases for the optimal user experience, be it good immersion or convenient and stressless movie watching.

The dependent claims are directed to selected embodiments of the invention.

According to one embodiment, the eyepiece is adapted to provide an image of essentially equally sized areas of the image plane at said exit pupil in the first and second states. That is, no cropping of the image plane takes place but all pixels of the display element place at the image plane are be utilized by both states, providing maximal image quality. This is beneficial also because the display device does not need "know" which state the viewer is using but can simply use the whole available image area. It should be noted that the term "essentially equally sized areas" is used in relation to (non-)cropping the available display area. It therefore covers cases where potential image distortion takes place.

According to one embodiment, the lens groups comprise a first movable positive lens group located closest to the exit pupil, a third stationary positive lens group located closest to the image plane, and a second movable negative lens group between the first lens group and the third lens group. In a further embodiment, the first lens group and the second lens group are adapted to move farther from the third lens group and closer to each other when moving from the first state to the second state. The configuration may resemble a so-called Donders-zoom construction, however applied to an eyepiece. This provides a variable field-of-view on the display, still keeping the binocular convergence calibration valid, or at least reduces possibilities for calibration errors, all the time in two-eye solutions.

According to one embodiment, the second lens group is adapted to be in the vicinity of (e.g. essentially in contact with) the third lens group in the first state and in the vicinity of (e.g. essentially in contact with) the first lens group in the second state. This provides maximal change of field-of-view with a given total extension of the eyepiece.

According to one embodiment, the first field of view is 100 degrees or more, such as 110 degrees or more, and even 115 degrees or more, and the second field of view is 65 degrees or less, typically 60 degrees or less, such as 50 degrees or less, and even 40 degrees or less. The first field-of-view can be chosen e.g. between 100 and 130 degrees and the second field-of-view e.g. between 30 and 65 degrees. Such zoom factor on one hand allows for sufficient projection angle for utilization of large display area close to the eyepiece in the wide angle state, and on the other hand reasonable increase of system length, yet allowing for high image quality in the zoomed state.

According to one embodiment each of the lens groups comprises at most two lens elements, in particular at least two of the lens groups comprising only a single lens element.

According to one embodiment, the exit pupil is located outside the lens system, i.e., at a distance from the lens groups.

According to one embodiment, the eyepiece comprises means for continuous zooming between the first state (first field-of-view) and second state (second filed-of-view). That is, the user may immobilize the lens groups in any desired position between and including the first and second states so that a sharp image of the image plane is formed at the exit pupil.

According to one embodiment of the personal display device, in addition to the display element and the eyepiece, the device comprises a processing unit functionally connected to the display element for displaying content on the display element, and adjusting means for changing the state of the eyepiece between the first state and the second state, i.e. suitably moving the movable lens groups.

According to a further embodiment, the eyepiece and/or the personal display device the eyepiece is used in comprises mechanical and/or electrical adjustment means for the user to switch between the first and second states of the eyepiece.

The display element can be an integral part of the device or a separate element attachable thereto. In particular, the display element can comprise a screen of a mobile phone, which is mountable to the personal display device such that its screen comes to the image plane of the eyepiece.

According to one embodiment, the device comprises two similar eyepieces arranged in binocular configuration and targeted either on different portions of the same display element or on separate display elements.

Next, selected embodiments of the invention and advantages thereof are discussed with reference to the attached drawings.

DETAILED DESCRIPTION OF EMBODIMENTS

The term "eyepiece" generally refers to an optical device that is designed for projecting an image from an image plane on one side of the device through an exit pupil located on the opposite side of the device at a non-zero distance therefrom. An eyepiece of this kind allows for viewing a sharp and enlarged image of the image plane with a bare eye.

The term "lens element" refers to a single optical lens in contrast with the term "lens group" that may comprise either a single lens or two or more lenses in a predefined mutual configuration.

The term "wide angle" state (first state) here refers to a field of view of 100 degrees or more and the term "tele" or "zoomed" state (second state) to a field of view of 65 degrees or less.

Figure 1A:
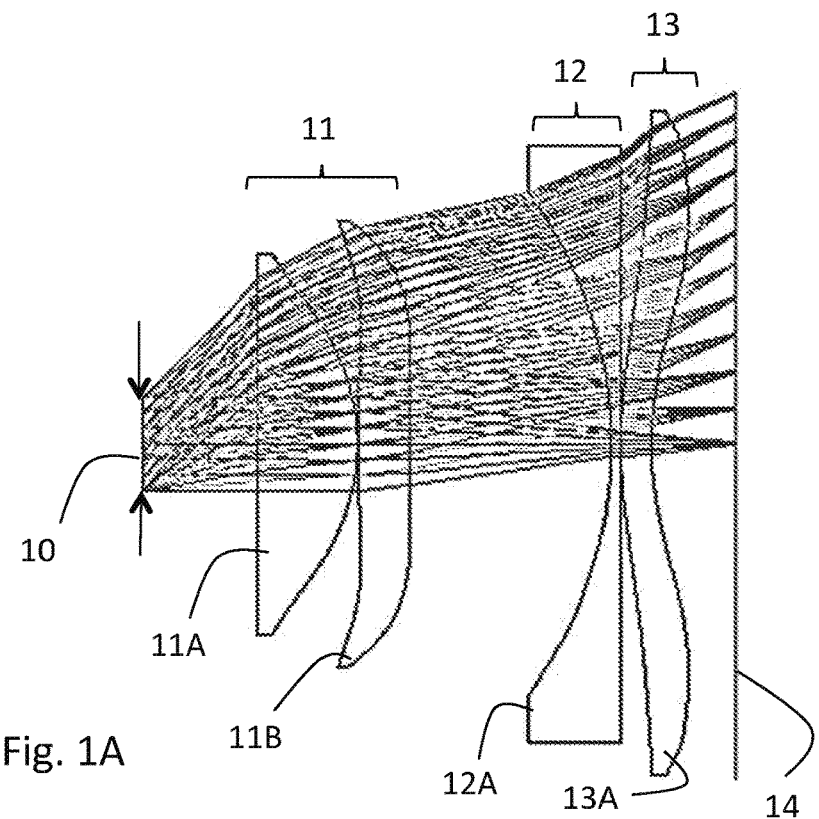
FIGS. 1A and 1B show the optical configurations of the eyepiece according to one embodiment in a wide-angle state and tele state, respectively.
Figure 1B:
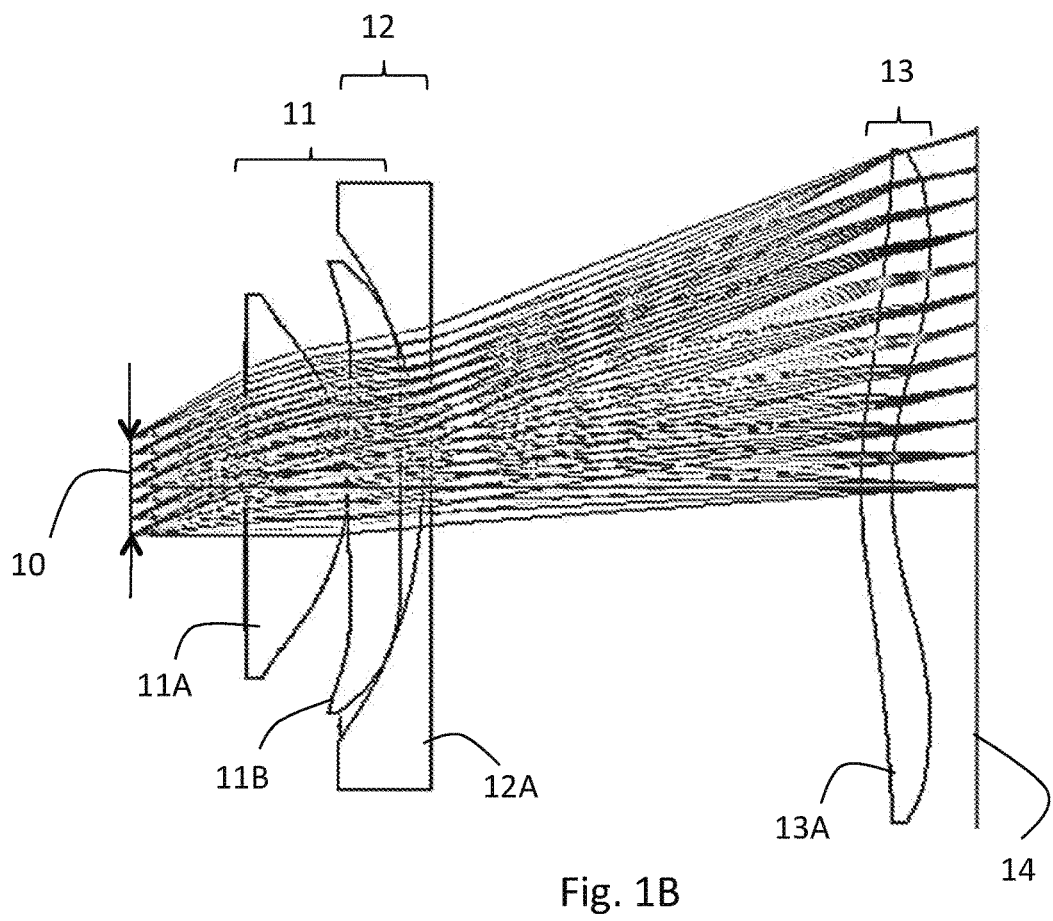

In FIGS. 1A and 1B, an outline of an exemplary lens system of an eyepiece is shown in wide-angle and narrow-angle viewing configurations, respectively. The image plane, such as a display surface, is herein denoted with reference numeral 14, whereas the exit pupil is denoted with reference numeral 10. A support structure of the lens system is not shown, but it is understood by a skilled person that some kind of a mechanical structure for holding the necessary lens groups and allowing for moving the movable lens groups must be provided to form an operational eyepiece. Various such structures are known per se.

There is provided a negative middle lens group 12 (second lens group), which is surrounded by positive lens groups 11 (first lens group) and 13 (third lens group). The second lens group 12 acts as a variator lens group. The third lens group 13 is closest to and fixed with respect to a display 14, whereas the first and second lens groups 11 and 12 are moveable.

In general, each lens group 11, 12, 13 can contain one or more lens elements, the refractive power being divided between the elements.

According to one embodiment, the first lens group 11 comprises, preferably consists of, two lens elements 11A, 11B. According to one embodiment, the first lens element 11A, which comes closest to the eye, is a plano-convex lens with the planar surface facing towards the eye, whereas the neighboring second lens element 11B is a meniscus lens or the like. According to one embodiment, the second lens element 11B is a positive meniscus lens, although in some configurations it may also be a negative meniscus lens. Typically, the second lens element 11B is aspherical like shown in FIGS. 1A and 1B. It should be noted that the lenses are not necessarily directly classifiable to any single category but have custom aspheric features.

According to an alternative embodiment, the first lens group 11 comprises, in particular consists of, a single Fresnel lens element. However, a two-lens solution is preferred for image quality reasons.

According to one embodiment, the second lens group 12 comprises, preferably consists of, a plano-concave lens element 12A, with the planar side facing the third lens group 13 and the display 14.

According to one embodiment, the third lens group 13 comprises, preferably consist of, a wavefront corrector lens element 13A, which serves to correct the shape of the wavefront close to the image source. Typically, the third lens element 13A is aspheric. The third lens is static with respect to the display.

According to one embodiment, the first and second lens groups 11 and 12 are movable between a first state (wide angle state) and second state (tele state) so that their distance from the third lens group is increased when moved from the first state towards the second state. In one embodiment, the first lens group travels a first distance and second lens group travels a second, longer distance from a first position in the vicinity of the third lens group to a second position in the vicinity of the first lens group.

According to an alternative embodiment, the first lens group 11 is stationary and lens groups 12 and 13 movable. This will, however, also require the display to move, and in order to keep the binocular convergence calibration valid, it is not as preferred as the option where groups 11 and 12 are movable.

The zoom factor is mainly limited by the increase of the system length. It may also be possible to design the system in a way of internal zooming principle, where the total length of the optical system does not change. The presented embodiment, with extendable structure is, however, preferred in applications where the shortest possible dimension of the eyepiece in the wide angle state is desired.

In some embodiments, the exit pupil is located at a distance of at least 8 mm from the lens groups. This allows for convenient viewing and prevents eyelashes from hitting the eyepiece.

There may also be provided diopter adjustment means, which are known per se, functionally connected to the eyepiece.

Figure 2A:
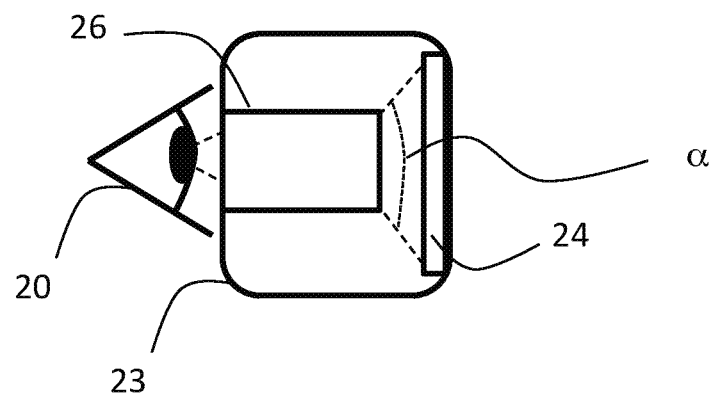
FIGS. 2A and 2B illustrate schematically a personal display device comprising an eyepiece of the present kind in side and top views, accordingly.

FIG. 2A shows a personal display 23 according to one embodiment. The display 23 comprises a display element 24 and an eyepiece 26 of the present kind positioned so that the display element 24 covers the entire field-of-view α of the eyepiece 26 in wide angle state (and consequently also in the tele state). Thus, the viewer's eye 20, brought close to or at the exit pupil, will catch the image presented of at the display element.

Figure 2B:
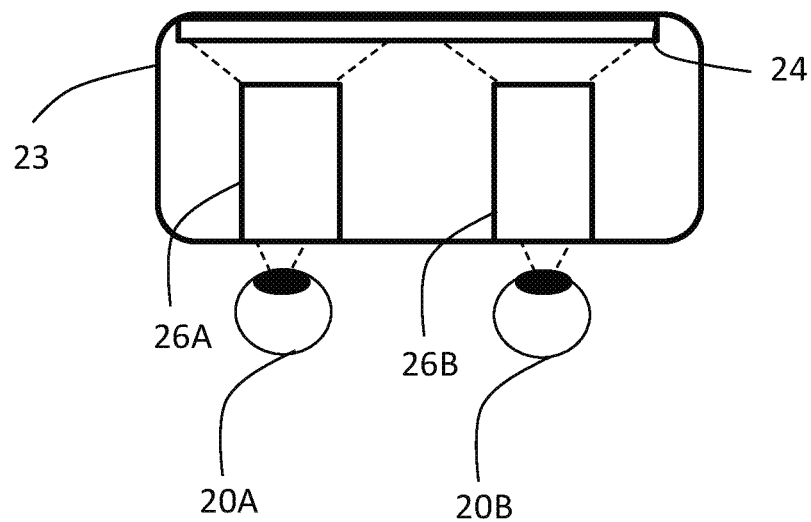

FIG. 2B shows an embodiment of a personal display device 23, where two eyepieces 26A, 26B of the present kind are provided in binocular configuration and targeted on different portions of a single display element 24 and for both eyes 20A, 20B of a user. Naturally, there may also be two display elements, one for each eyepiece. This way, by presenting suitably different image content at suitable positions of the display element(s) 24 or suitably positioned display elements 24 for each eye 20A, 20B, a three-dimensional experience can be provided for the user.

The term personal display system, as herein used, refers to a display system intended to be viewed by a single person. Examples of personal display systems include various head-mounted displays (HMDs), such as virtual reality (VR) devices, augmented reality (AR) devices and so-called wearable smart display devices.

The personal display system typically may contain all necessary components for producing, processing and displaying content for the user via the display element and the eyepiece or be adapted to function as a display unit only receiving the data to be displayed from an external source. Typically, in a minimum configuration, there is provided a processing unit functionally connected to the display element, the processing unit being capable of receiving a data signal representing the content to be displayed from an external or internal source, and controlling the display element accordingly to show the content thereon.

According to one embodiment, the processing unit is adapted to apply a software-based geometric correction on the image to be displayed, taking into account the optical distortion characteristics of the eyepiece. In an alternative embodiment, the processing unit does not perform such correction. This is also possible with the present optical system, which performs well in particular in the tele state. Thus, the image seen by the user may geometrically essentially correspond to that displayed in the display element.

The display element 24 may be opaque or at least partially transparent. In the latter case, a so called see-through display device can be provided where the display device is capable of passing, in addition to the image displayed at the display element, also ambient light to the user, who sees them simultaneously.

EXAMPLE

An exemplary lens configuration that is schematically represented by FIGS. 1A and 1B is represented by the surface parametrization formula $$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}.$$

where r is the distance from optical axis, limited by semi-diameter; c is the surface curvature (inverse of surface radius of curvature); k is the conic constant and α is the aspherical coefficient.

In one example, the surface data of the lenses are as listed in Table 1, starting from the exit pupil (STOP) and going towards the display (DISP). The term "Thickness" refers to a distance between centre points of successive surfaces comprising material having properties indicated in the "Refractive index" and "Abbe number columns" (which are empty for air).

Exemplary aspherical coefficients of the surfaces are listed in Table 2.

Exemplary design thicknesses are shown in Table 3.

General properties of the exemplary eyepiece are given in Table 4.

TABLE 1

Lens surface data

| Surface # | Radius of curvature [mm] | Thickness [mm] | Refractive index $n_d$ | Abbe number $V_d$ | Semi-Diameter [mm] |
|---|---|---|---|---|---|
| STOP | PLANO | 12.00 | | | 5.00 |
| 2 | −269.18 | 5.87 | 1,720 | 34.7 | 20.50 |
| 3 | −30.80 | 0.00 | | | 20.50 |
| 4 | 82.24 | 7.93 | 1,720 | 34.7 | 25.00 |
| 5 | −267.21 | Variable | | | 25.00 |
| 6 | −158.14 | 1.00 | 1,847 | 23.8 | 25.50 |
| 7 | 98.86 | Variable | | | 25.50 |
| 8 | 67.44 | 6.04 | 1,720 | 34.7 | 25.50 |
| 9 | 446.27 | 4.044 | | | 25.50 |
| DISP | PLANO | | | | 26.55 |

TABLE 2

Aspherical coefficients of lens surfaces

| Surface # | Conic constant k | α1 | α2 | α3 | α4 | α5 |
|---|---|---|---|---|---|---|
| 2 | 0.00 | 0 | 2.260E−05 | −3.374E−08 | −7.406E−11 | 1.709E−13 |
| 3 | 0.00 | 0 | 2.662E−05 | −1.529E−08 | 6.230E−11 | −1.472E−13 |
| 4 | 0.00 | 0 | 4.485E−06 | 5.025E−10 | −9.258E−13 | −4.686E−15 |
| 5 | 0.00 | 0 | −2.438E−07 | −1.355E−09 | 2.454E−13 | −2.076E−15 |
| 8 | 0.00 | 0 | −7.238E−07 | −1.720E−09 | −2.296E−12 | 6.074E−17 |
| 9 | 0.00 | 0 | −3.283E−06 | −1.413E−09 | −2.313E−13 | −1.070E−15 |

TABLE 3

Lens thicknesses

| Surface # | Wide | Tele |
|---|---|---|
| 5 | 18,354 | 0.381 |
| 7 | 0 | 31.82 |

TABLE 4

Eyepiece properties

| Property | Wide | Tele |
|---|---|---|
| Focal length | 32.14 | 44.86 |
| F/# | 3.18 | 4.47 |
| FFOV [dgr] | 110 | 60.5 |
| Distortion % | 41.9 | 4 |
| Total length | 69.06 | 55.27 |

Figure 3A:
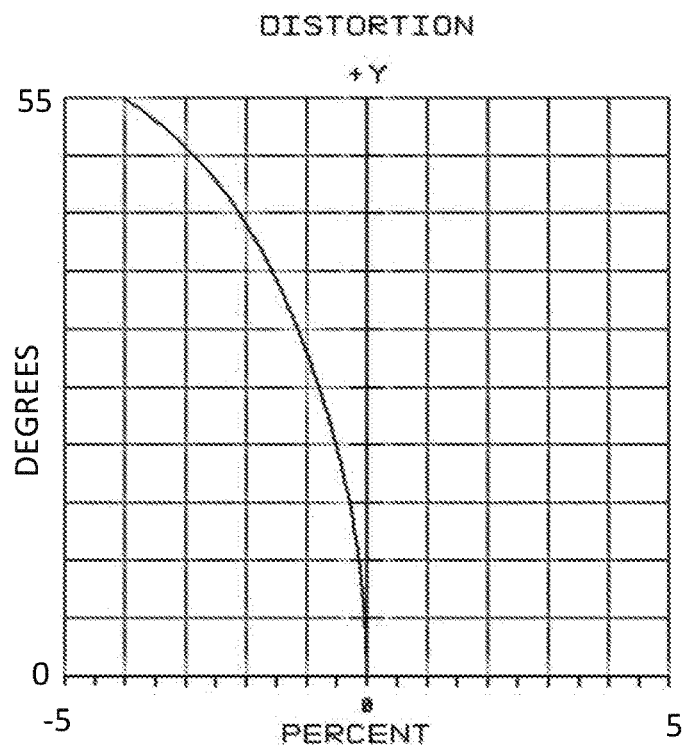
FIGS. 3A and 3B show distortion graphs of an exemplary eyepiece in tele and wide angle states, respectively.
Figure 3B:
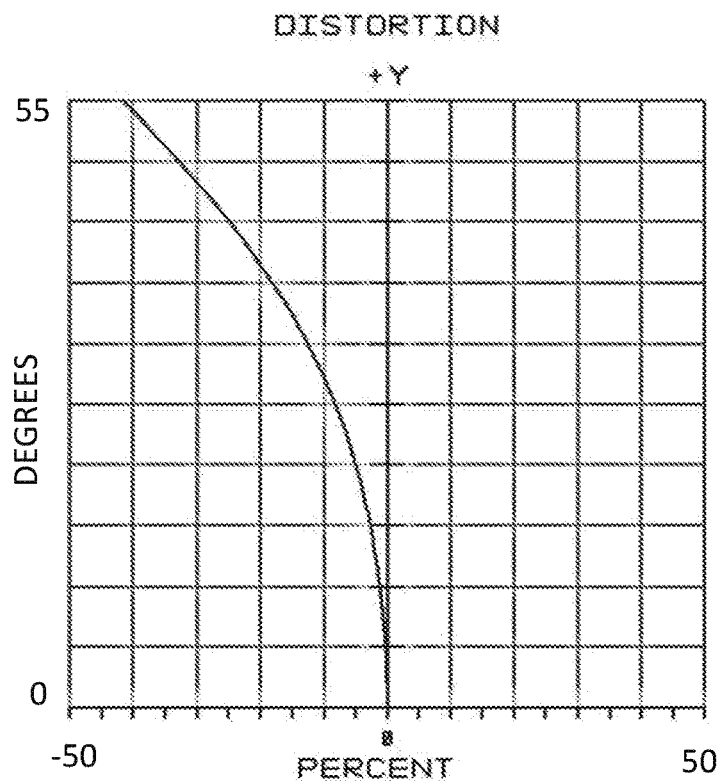

FIGS. 3A and 3B show distortion graphs of the exemplary eyepiece in tele and wide angle states, respectively (as seen when light is coming from the left in the configuration of FIGS. 1B and 1A).

The invention claimed is:

1. An eyepiece for projecting an image from an image plane on one side of the eyepiece through an exit pupil on the opposite side of the eyepiece, comprising:
   a stationary lens group and two movable lens groups being movable with respect to the stationary lens group along an optical axis between the image plane and the exit pupil,
wherein the lens groups are arranged in positive-negative-positive configuration and the movable lens groups are arranged to move along the optical axis between a first state providing a first field-of-view and a second state providing a second field-of-view smaller than the first field-of-view to the image plane wherein the eyepiece is adapted to provide an image of essentially equally sized area of the image plane at said exit pupil in said first and second states,
wherein the lens groups comprise:
   a first movable positive lens group located closest to the exit pupil,
   a third stationary positive lens group located closest to the image plane, and
   a second movable negative lens group between the first lens group and the third lens group,
whereby the first lens group and the second lens group are adapted to move farther from the third lens group and closer to each other when moving from the first state to the second state.

2. The eyepiece according to claim 1, wherein the second lens group is adapted to be in the vicinity of the third lens group in the first state and in the vicinity of the first lens group in the second state.

3. The eyepiece according to claim 1, wherein the first field-of-view is 100 degrees or more and the second field-of-view is 65 degrees or less.

4. The eyepiece according to claim 1, wherein each of the lens groups comprises at most two lens elements.

5. The display device according to claim 1, wherein the display element is configured so that the lens groups may be immobilized in any desired position between and including the first and second states.

6. The eyepiece according to claim 1, wherein at least two of the lens groups comprise only a single lens element.

7. A personal display device comprising:
   a display element, and
   an eyepiece for projecting an image from the display element to an eye of a viewer,
the eyepiece comprising:
   a stationary lens group and two movable lens groups being movable with respect to the stationary lens group along an optical axis between the image plane and the exit pupil,
wherein the lens groups are arranged in positive-negative-positive configuration and the movable lens groups are arranged to move along the optical axis between a first state providing a first field-of-view and a second state providing a second field-of-view smaller than the first field-of-view to the image plane wherein the eyepiece is adapted to provide an image of essentially equally sized area of the image plane at said exit pupil in said first and second states,
wherein the lens groups comprise:
   a first movable positive lens group located closest to the exit pupil,
   a third stationary positive lens group located closest to the image plane, and
   a second movable negative lens group between the first lens group and the third lens group,
whereby the first lens group and the second lens group are adapted to move farther from the third lens group and closer to each other when moving from the first state to the second state,
whereby the display element is positioned at said image plane.

8. The display device according to claim 7, further comprising a processing unit functionally connected to the display element for displaying content on the display element.

9. The display device according to claim 7, further comprising two such eyepieces in binocular configuration.

10. The display device according to claim 7, wherein the device is a wearable device.

11. An eyepiece for projecting an image from an image plane on one side of the eyepiece through an exit pupil on the opposite side of the eyepiece, comprising:
   a stationary lens group and two movable lens groups being movable with respect to the stationary lens group along an optical axis between the image plane and the exit pupil,
wherein the lens groups are arranged in positive-negative-positive configuration and the movable lens groups are arranged to move along the optical axis between a first state providing a first field-of-view and a second state providing a second field-of-view smaller than the first field-of-view to the image plane wherein the eyepiece is adapted to provide an image of essentially equally sized area of the image plane at said exit pupil in said first and second states,
wherein the first field-of-view is 100 degrees or more and the second field-of-view is 65 degrees or less.

* * * * *